United States Patent [19]

D'Sidocky et al.

[11] Patent Number: 5,736,615
[45] Date of Patent: Apr. 7, 1998

[54] RUBBER VULCANIZATION COMPOSITION

[75] Inventors: Richard Michael D'Sidocky, Ravenna; Neil Arthur Maly, Tallmadge, both of Ohio

[73] Assignee: The Goodyear Tire & Rubber Company, Akron, Ohio

[21] Appl. No.: 863,891

[22] Filed: Apr. 6, 1992

[51] Int. Cl.$^6$ .................................................. C08C 19/20
[52] U.S. Cl. ................................ 525/329.3; 525/331.1; 525/332.7; 525/352
[58] Field of Search .................... 525/329.3, 330.9, 525/331.1, 332.6, 332.7

[56] References Cited

U.S. PATENT DOCUMENTS

| | | | |
|---|---|---|---|
| 4,933,385 | 6/1990 | Yamamoto et al. | 524/105 |
| 4,960,833 | 10/1990 | Nagasaki et al. | 525/329.3 |

FOREIGN PATENT DOCUMENTS

| | | |
|---|---|---|
| 0345825 | 12/1989 | European Pat. Off. . |
| 4036420 | 5/1991 | Germany . |
| 4038946 | 6/1991 | Germany . |

OTHER PUBLICATIONS

Database WPI, Week 9116, Derwent Publications Ltd., London, GB; & JP-A-03 056 544 (Bridgestone Corp.) 12 Mar. 1991.
Kautschuk Und Gummi-Kunststoffe, vol. 42, No. 10, 1989, Heidelberg, DE, pp. 878–879, Th. Kuhlmann 'A new thiuram acceleration without dangerous and volatile nitrosamines'.
A.S. Prashchikina, et al, Kauchuk i Rezina, No. 7, (1979), p. 14.
Chemical Abstracts for DE 4027114.
Chemical Abstracts for EP 284650.
Chemical Abstracts for EP 283552.
Chemical Abstracts for U.S. Patent 3,379,707.
Abstract for JP 03056544.
CA 114(16):145197b.
CA 112(24):218496u.
CA 112(20):181122r.
CA 110(10):77298a.
CA 110(10):77297z.
CA 91(8):58435r.
Abstract for the IRC—85 Kyoto; International Rubber Conference proceedings in Kyoto, Japan, Oct. 15–18, 1985, Paper 18J01, pp. 875–880.
Jablonowski, T. L., "TBzTD and CBBS—Alternative Accelerators for Reducing Nitrosamine Generation", *Rubber World*, (1992), pp. 18–22.
Europäische Patentanmeldung (EP) 0,283,552 Sep. 28, 1988.

*Primary Examiner*—Christopher Henderson
*Attorney, Agent, or Firm*—Bruce J. Hendricks

[57] ABSTRACT

This invention relates to the discovery that tetrabenzylthiuram disulfide in combination with a bismaleimide compound and a sulfenamide compound provides for excellent vulcanization of rubbers and results in an improved final rubber vulcanizate possessing superior physical properties and reversion resistance.

6 Claims, No Drawings

RUBBER VULCANIZATION COMPOSITION

BACKGROUND OF THE INVENTION

This invention relates to the vulcanization of diene elastomers. More particularly, the invention relates to an improved accelerator composition for the vulcanization of diene elastomers as well as to a method of vulcanization therewith.

In the manufacture of rubber articles, crude or raw rubber is compounded with various ingredients among which are sulfur and accelerators of vulcanization. The primary function of an accelerator or accelerator system is to increase the rate of the vulcanization process while allowing sufficient time to mix the accelerators into the rubber at an elevated temperature before vulcanization commences. This delay before the initiation of vulcanization is commonly referred to as scorch time.

The properties of a final rubber vulcanizate that are of importance include tensile strength, set, hysteresis, aging properties, reversion resistance and others. Other factors relating to the vulcanization which are of importance are the rate of cure, the cure time, the scorch behavior, the extent of cure, and tear resistance. These physical properties can be altered either beneficially or detrimentally through the inclusion of chemicals or components that impact upon the rate and state of vulcanization.

Many accelerator combinations have been used in the rubber industry. Unfortunately, many of the known accelerators, such as morpholine containing accelerators, and dimethylamine containing accelerators yield volatile nitrosamines upon use. The use of accelerators which yield volatile nitrosamines have been significantly restricted in a number of countries and the need to find a suitable replacement is eminent.

SUMMARY OF THE INVENTION

The present invention relates to a vulcanization composition for natural rubber, rubbers derived from diene monomers or mixtures thereof. The vulcanization composition comprises (a) tetrabenzylthiuram disulfide; (b) a bismaleimide; (c) a sulfenamide compound and (d) sulfur, a sulfur donor or mixture thereof.

DETAILED DESCRIPTION OF THE INVENTION

There is disclosed a rubber vulcanization composition comprising:

(a) from about 2 to about 15 weight percent of tetrabenzylthiuram disulfide;

(b) from about 15 to about 50 weight percent of a bismaleimide compound of the general formula:

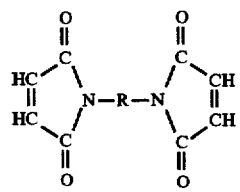

wherein R is divalent and is selected from the group consisting of acyclic aliphatic groups having from about 2 to 16 carbon atoms, cyclic aliphatic groups having from about 5 to 20 carbon atoms, aromatic groups having from about 6 to 18 carbon atoms, and alkylaromatic groups having from about 7 to 24 carbon atoms and wherein these divalent groups may contain a hetero atom selected from O, N and S;

(c) from about 15 to about 45 weight percent of a sulfenamide compound of the general formula:

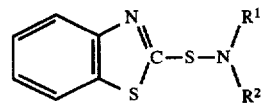

wherein $R^1$ is selected from the group consisting of hydrogen, acyclic aliphatic groups having from about 1 to 10 carbon atoms, and cyclic aliphatic groups having from about 5 to 10 carbon atoms; and $R^2$ is selected from the group consisting of cyclic aliphatic groups having from about 5 to 10 carbon atoms and a mercaptobenzothiazolyl group of the formula:

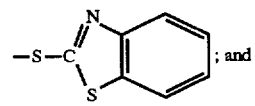 ; and (d) from about 20 to about 55 weight percent of sulfur, a sulfur donor or mixtures thereof.

There is also disclosed a rubber stock comprising:

(a) a rubber selected from the group consisting of natural rubber, a rubber derived from a diene monomer and mixture thereof;

(b) from about 0.10 to about 0.75 phr of tetrabenzylthiuram disulfide;

(c) from about 0.5 to about 3 phr of a bismaleimide compound of the general formula:

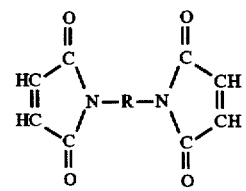

wherein R is divalent and is selected from the group consisting of acyclic aliphatic groups having from about 2 to 16 carbon atoms, cyclic aliphatic groups having from about 5 to 20 carbon atoms, aromatic groups having from about 6 to 18 carbon atoms, and alkylaromatic groups having from about 7 td 24 carbon atoms and wherein these divalent groups may contain a hetero atom selected from O, N and S;

(d) from about 0.5 phr to about 3 phr of a sulfenamide compound of the general formula:

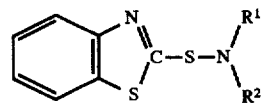

wherein $R^1$ is selected from the group consisting of hydrogen, acyclic aliphatic groups having from about 1 to 10 carbon atoms, and cyclic aliphatic groups having from about 5 to 10 carbon atoms; and $R^2$ is selected from the group consisting of cyclic aliphatic groups having from about 5 to 10 carbon atoms and a mercaptobenzothiazolyl group of the formula:

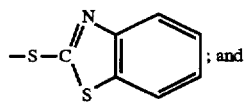; and (e) from about 0.5 to about 6 phr of sulfur, a sulfur donor or mixtures thereof.

The first essential component in the claimed invention is tetrabenzylthiuram disulfide. When the tetrabenzylthiuram disulfide is viewed as part of a vulcanization system, it is generally present in an amount of from about 2 to about 15 weight percent. Preferably, the tetrabenzylthiuram disulfide is in an amount of from about 2.5 to 12.5 weight percent. When the vulcanization system of the present invention is added to a rubber stock, the tetrabenzylthiuram disulfide is present in an amount of from about 0.10 to 0.75 phr. Preferably, the tetrabenzylthiuram disulfide is present in an amount ranging from about 0.10 to about 0.50 phr.

The bismaleimide is the second essential component in the claimed invention. When the bismaleimide is viewed as part of a vulcanization system, it is 15 to 50 weight percent. Preferably, the bismaleimide is in an amount of from about 20 to 36 weight percent. When the vulcanization system of the present invention is added to a rubber stock, the bismaleimide is present in an amount of from about 0.5 to 3 phr. Preferably, the bismaleimide is present in an amount ranging from about 0.65 to about 2 phr.

Representative of the bismaleimides of formula I and which may be used in the present invention include N,N'-ethylenebismaleimide, N,N'-hexamethylenebismaleimide, N,N'-dodecamethylenebismaleimide, N,N'-(2,2,4-trimethylhexamethylene)bismaleimide, N,N'-(oxydipropylene)bismaleimide, N,N'-(aminodipropylene)-bismaleimide, N,N'-(ethylenedioxydipropylene)-bismaleimide, N,N'(1,4-cyclohexylene)bismaleimide, N,N'-(1,3-cyclohexylene)bismaleimide, N,N'-(methylene-1,4dicyclohexylene)bismaleimide, N,N'-(isopropylidene-1,4-dicyclohexylene)bismaleimide, N,N'-(oxy-1,4-dicyclohexylene)bismaleimide, N,N'-(m-phenylene)bismaleimide, N,N'-p-(phenylene)-bismaleimide, N,N'-(o-phenylene)bismaleimide, N,N'-(1,3-naphthylene)bismaleimide, N,N'-(1,4-naphthylene)-bismaleimide, N,N'-(1,5-naphthylene)bismaleimide, N,N-(3,3'-dimethyl-4,4'-diphenylene)bismaleimide, N,N'-(3,3-dichloro-4,4'-biphenylene)bismaleimide, N,N'-(2,4-pyridyl)bismaleimide, N,N'-(2,6-pyridyl)-bismaleimide, N,N'-(1,4-anthraquinonediyl)-bismaleimide, N,N'-(m-tolylene)bismaleimide, N,N'-(p-tolylene)bismaleimide, N,N'-(4,6-dimethyl-1,3-phenylene)bismaleimide, N,N'-(2,3-dimethyl-1,4-phenylene)bismaleimide, N,N'-(4,6-dichloro-1,3-phenylene)bismaleimide, N,N'-(5-chloro-1,3-phenylene)-bismaleimide, N,N'-(5-hydroxy-1,3-phenylene)-bismaleimide, N,N'-(5-methoxy-1,3-phenylene)-bismaleimide, N,N'-(m-xylylene)bismaleimide, N,N'-(p-xylylene)bismaleimide, N,N'-(methylenedi-p-phenylene)-bismaleimide, N,N'-(isopropylidenedi-p-phenylene)-bismaleimide, N,N'-(oxydi-p-phenylene)bismaleimide, N,N'-(thiodi-p-phenylene)bismaleimide, N,N'-(dithiodi-p-phenylene)bismaleimide, N,N'-(sulfodi-p-phenylene)-bismaleimide, N,N'-(carbonyldi-p-phenylene)-bismaleimide, α,α-bis-(4-maleimidophenyl)-meta-diisopropylbenzene, α,α-bis-(4-p-phenylene)bismaleimide and α,α-bis-(4-maleimidophenyl)-para-diisopropylbenzene. The preferred bismaleimide is N,N'-(m-phenylene) bismaleimide.

The sulfenamide compound of formula II is the third essential component of the present invention. When the sulfenamide is viewed as part of a vulcanization system, it is generally present in an amount of from about 15 to 45 weight percent. Preferably, the sulfenamide compound is present in an amount of from about 17 to 42 weight percent. When the vulcanization system of the present invention is added to a rubber stock, the sulfenamide is present in an amount of from about 0.5 to about 3 phr. Preferably, the sulfenamide is present in an amount ranging from about 0.70 to about 2.0 phr.

Representative of the sulfenamide compounds of formula II and which may be used in the present invention include N-cyclohexyl-2-benzothiazylsulfenamide, N-t-butyl-2-benzothiazylsulfenamide, N,N-dicyclohexyl-2-benzothiazylsulfenamide, N-isopropyl-2-benzothiazylsulfenamide, and N-t-butylbis-(2-benzothiazylsulfen)amide. Preferably, the sulfenamide compound is N-cyclohexyl-2-benzothiazylsulfenamide.

Rubber stocks may be used with the rubber vulcanization composition of the present invention. Examples of rubbers include substituted and unsubstituted, saturated and unsaturated, natural and synthetic polymers. The natural polymers include natural rubber in its various forms, e.g., pale crepe and smoked sheet, and balata and gutta percha. The synthetic polymers are derived from a diene monomer and include those prepared from a single monomer (homopolymer) or a mixture of two or more copolymerizable monomers (copolymer) when the monomers are combined in the random distribution or block form. The monomers may be substituted or unsubstituted and may possess one or more double bonds, conjugated and nonconjugated dienes and monoolefins, including cyclic and acyclic monoolefins, especially vinyl and vinylidene monomers. Examples of conjugated dienes are 1,3-butadiene, isoprene, chloroprene, 2-ethyl-1,3-butadiene, 2,3-dimethyl-1,3-butadiene and piperylene. Examples of nonconjugated dienes are 1,4-pentadiene, 1,4-hexadiene, 1,5-hexadiene, dicyclopentadiene, 1,5-cyclooctadiene, and ethyldiene norbornene. Examples of acyclic monoolefins are ethylene, propylene, 1-butene, isobutylene, 1-pentene and 1-hexene. Examples of cyclic monoolefins are cyclopentene, cyclohexene, cycloheptene, cyclooctene and 4-methylcyclooctene. Examples of vinyl monomers are styrene, acrylonitrile, acrylic acid, ethylacrylate, vinyl chloride, butylacrylate, methyl vinyl ether, vinyl acetate and vinyl pyridine. Examples of vinylidene monomers are alpha-methylstyrene, methacrylic acid, methyl methacrylate, itaconic acid, ethyl methacrylate, glycidyl methacrylate and vinylidene chloride. Representative examples of the synthetic polymers used in the practice of this invention are polychloroprene homopolymers of a conjugated 1,3-diene such as isoprene and butadiene, and in particular, polyisoprenes and polybutadienes having essentially all of their repeat units combined in a cis-1,4-structure; and copolymers of a conjugated 1,3-diene such as isoprene and butadiene with up to 50% by weight of at least one copolymerizable monomer, including ethylenically unsaturated monomers such as styrene or acrylonitrile; and butyl rubber, which is a polymerization product of a major proportion of a monoolefin and a minor proportion of a diolefin such as butadiene or isoprene.

The preferred rubbers which may be used with the present invention are cis-1,4-polyisoprene (natural or synthetic), polybutadiene, polychloroprene and the copolymers of isoprene and butadiene, copolymers of acrylonitrile and butadiene, copolymers of acrylonitrile and isoprene, copolymers of styrene, butadiene and isoprene, copolymers of styrene and butadiene and blends thereof.

As known to one skilled in the art, in order to cure a rubber stock, one needs to have a sulfur vulcanizing agent.

Examples of suitable sulfur vulcanizing agents include elemental sulfur (free sulfur) or a sulfur donating vulcanizing agent, for example, an amine disulfide, polymeric polysulfide or sulfur olefin adducts. Preferably, the sulfur vulcanizing agent is elemental sulfur. The amount of sulfur vulcanizing agent will vary depending on the components of the rubber stock and the particular type of sulfur vulcanizing agent that is used. Generally speaking the amount of sulfur vulcanizing agent in the vulcanization system of the present invention ranges from about 20 to about 55 weight percent. Preferably, the sulfur vulcanizing agent ranges from about 23 to 43 weight percent. When the vulcanization system of the present invention is added to a rubber stock, the sulfur vulcanizing agent is present in an amount ranging from about 0.5 to about 6 phr. Preferably, the sulfur vulcanizing agent is present in an amount ranging from about 0.75 phr to about 2.0 phr.

Conventional rubber additives may be incorporated in the rubber stock of the present invention. The additives commonly used in rubber stocks include fillers, plasticizers, waxes, processing oils, retarders, antiozonants, antioxidants and the like. The total amount of filler that may be used may range from about 30 to about 150 phr, with a range of from about 45 to about 70 phr being preferred. Fillers include silicas, clays, calcium carbonate, calcium silicate, titanium dioxide and carbon black. HAF Black (N-330) and GPF-Black (N-660) are commonly used in rubber stocks intended for use as wire coats or carcass ply coats. Preferably, at least a portion of the filler is carbon black. Plasticizers are conventionally used in amounts ranging from about 2 to about 50 phr with a range of about 5 to about 30 phr being preferred. The amount of plasticizer used will depend upon the softening effect desired. Examples of suitable plasticizers include aromatic extract oils, petroleum softeners including asphaltenes, pentachlorophenol, saturated and unsaturated hydrocarbons and nitrogen bases, coal tar products, cumarone-indene resins and esters such as dibutylphthalate and tricresyl phosphate. Common waxes which may be used include paraffinic waxes and microcrystalline blends. Such waxes are used in amounts ranging from about 0.5 to 3 phr. Materials used in compounding which function as an accelerator-activator includes metal oxides such as zinc oxide, magnesium oxide and litharge which are used in conjunction with acidic materials such as fatty acid, for example, stearic acid, oleic acid, murastic acid, and the like. The amount of the metal oxide may range from about 1 to about 10 phr with arrange of from about 2 to about 8 phr being preferred. The amount of fatty acid which may be used may range from about 0.25 phr to about 5.0 phr with a range of from about 0.5 phr to about 2 phr being preferred.

A class of compounding materials known as scorch retarders are commonly used. Phthalic anhydride, salicyclic acid, sodium acetate and N-cyclohexyl thiophthalimide are known retarders. Retarders are generally used in an amount ranging from about 0.1 to 0.5 phr.

In-situ resins may be used in the rubber stock and involve the reaction of resorcinol and a methylene donor. The term "methylene donor" is intended to mean a compound capable of reacting with the resorcinol and generate the resin in-situ. Examples of methylene donors which are suitable for use in the present invention include hexamethylenetetramine, hexaethoxymethylmelamine, hexammethoxymethylmelamine, lauryloxymethylpyridinium chloride, ethoxymethylpyridinium chloride, trioxan hexamethoxymethylmelamine, the hydroxy groups of which may be esterified or partly esterified, and polymers of formaldehyde such as paraformaldehyde. In addition, the methylene donors may be N-substituted oxymethylmelamines, of the general formula:

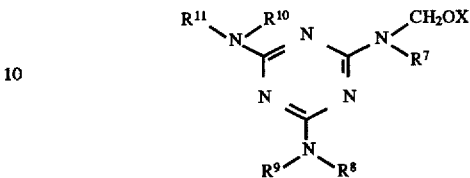

wherein X is an alkyl having from 1 to 8 carbon atoms, $R^7$ $R^8$, $R^9$, $R^{10}$ and $R^{11}$ are individually selected from the group consisting of hydrogen, an alkyl having from 1 to 8 carbon atoms, the group —$CH_2OX$ or their condensation products. Specific methylene donors include hexakis-(methoxymethyl)melamine, N,N',N"-trimethyl/N,N',N"-trimethylolmelamine, hexamethylolmelamine, N,N',N"-dimethylolmelamine, N-methylolmelamine, N,N'-dimethylolmelamine, N,N',N"-tris(methoxymethyl) melamine and N,N'N"-tributyl-N,N',N"-trimethylolmelamine. The N-methylol derivatives of melamine are prepared by known methods.

The amount of methylene donor and resorcinol that is present in the rubber stock may vary. Typically, the amount of methylene donor and resorcinol that is present will range from about 0.1 phr to 10.0 phr. Preferably, the amount of methylene donor and resorcinol ranges from about 2.0 phr to 5.0 phr.

The weight ratio of methylene donor to the resorcinol may vary. Generally speaking, the weight ratio will range from about 1:10 to about 10:1. Preferably, the weight ratio ranges from about 1:3 to 3:1.

Preformed phenol-formaldehyde type resins may be used in the rubber stock and are generally present in an amount ranging from about 1.0 to about 5.0 phr, with a range of from about 1.5 to about 3.5 phr being preferred.

Conventionally, antioxidants and sometimes antiozonants, hereinafter referred to as antidegradants, are added to rubber stocks. Representative antidegradants include monophenols, bisphenols, thiobisphenols, polyphenols, hydroquinone derivatives, phosphites, thioesters, naphthyl amines, diphenyl-p-phenylenediamines, diphenylamines and other diaryl amine derivatives, paraphenylenediamines, quinolines and mixtures thereof. Specific examples of such antidegradants are disclosed in The Vanderbilt Rubber Handbook (1990), pages 282–286. Antidegradants are generally used in amounts from about 0.25 to about 5.0 phr with a range of from about 1.0 to about 3.0 phr being preferred.

The present invention may be better understood by reference to the following examples in which the parts or percentages are by weight unless otherwise indicated.

EXAMPLE

Table I below shows the basic rubber stock that was used in this example. The rubber stock was prepared in a two-stage Banbury mix. All parts and percentages are by weight unless otherwise noted.

TABLE I

| Sample | Control 1 | Control 2 | 3 | Control 4 | 5 | Control 6 | Control 7 |
|---|---|---|---|---|---|---|---|
| Nonproductive | | | | | | | |
| Natural Rubber | 100.00 | 100.00 | 100.00 | 100.00 | 100.00 | 100.00 | 100.00 |
| Carbon Black | 50.00 | 50.00 | 50.00 | 50.00 | 50.00 | 50.00 | 50.00 |
| Paraffin Oil | 5.00 | 5.00 | 5.00 | 5.00 | 5.00 | 5.00 | 5.00 |
| Stearic Acid | 1.00 | 1.00 | 1.00 | 1.00 | 1.00 | 1.00 | 1.00 |
| TOTAL | 156.00 | 156.00 | 156.00 | 156.00 | 156.00 | 156.00 | 156.00 |
| PRODUCTIVE | | | | | | | |
| Wingstay® 100[1] | 0.75 | 0.75 | 0.75 | 0.75 | 0.75 | 0.75 | 0.75 |
| Zinc Oxide | 3.00 | 3.00 | 3.00 | 3.00 | 3.00 | 3.00 | 3.00 |
| Sulfur | 1.75 | 1.75 | 1.75 | 1.75 | 1.75 | 1.75 | 1.75 |
| CBTS[2] | 0.75 | 0.75 | 0.75 | 0.75 | 0.75 | 0.75 | 0.75 |
| Bismaleimide[3] | | | 1.30 | 1.30 | 0.65 | 1.30 | 0.65 |
| TBTD[4] | | 0.30 | 0.30 | | 0.15 | | |
| TMTD[5] | | | | | | 0.13 | 0.07 |
| TOTAL | 162.25 | 162.55 | 163.85 | 163.55 | 163.05 | 163.68 | 162.97 |

[1] An antidegradant commercially available from The Goodyear Tire & Rubber Company.
[2] N-cyclohexyl-2-benzothiazylsulfenamide.
[3] N,N'-(m-phenylene)bismaleimide.
[4] Tetrabenzylthiuram disulfide.
[5] Tetramethylthiuram disulfide.

Cure properties were determined using a Monsanto oscillating disc rheometer which was operated at a temperature of 150° C. and 100 cycles per minute. A description of oscillating disc rheometers can be found in the Vanderbilt Rubber Handbook edited by Robert O. Ohm (Norwalk, Conn., R. T. Vanderbilt Company, inc., 1990), pages 554–557. The use of this cure meter and standardized values read from the curve are specified in ASTM D-2084. A typical cure curve obtained on an oscillating disc rheometer is shown on page 555 of the 1990 edition of the Vanderbilt Rubber Handbook.

In such an oscillating disc rheometer, compounded rubber samples are subjected to an oscillating shearing action of constant amplitude. The torque of the oscillating disc embedded in the stock that is being tested that is required to oscillate the rotor at the vulcanization temperature is measured. The values obtained using this cure test are very significant since changes in the rubber or the compounding recipe are very readily detected. It is obvious that it is normally advantageous to have a fast cure rate.

The following tables report cure properties that were determined from cure curves that were obtained for the rubber stocks that were prepared. These properties include a torque minimum (Min. Torque), a torque maximum (Max. Torque), minutes to a 1 point (min/dNm) of the torque increase (t1), minutes to 25% of the torque increase (t25), minutes to 50% of the torque increase (t50), minutes to 75% of the torque increase (t75), minutes to 90% of the torque increase (t90) and difference between the maximum torque and minimum torque (delta torque).

Table II indicates the respective amounts of sulfur, N-cyclohexyl benzothiazole-2-sulfenamide, tetrabenzylthiuram disulfide and/or tetramethylthiuram disulfide.

TABLE II

| Sample | Control 1 | Control 2 | 3 | Control 4 | 5 | Control 6 | Control 7 |
|---|---|---|---|---|---|---|---|
| Sulfur | 1.75 | 1.75 | 1.75 | 1.75 | 1.75 | 1.75 | 1.75 |
| CBTS | 0.75 | 0.75 | 0.75 | 0.75 | 0.75 | 0.75 | 0.75 |
| Bismaleimide | | | 1.30 | 1.30 | 0.65 | 1.30 | 0.65 |
| TBTD | | 0.30 | 0.30 | | | | |
| TMTD | | | | | | 0.13 | 0.07 |
| Stress Strain for 15 min. Cure @ 150° C. | | | | | | | |
| 300% Modulus (MPa) | 10.39 | 12.20 | 14.08 | 10.69 | 12.13 | 12.23 | 11.04 |
| Tensile @ Break (MPa) | 21.17 | 21.87 | 22.88 | 18.87 | 22.28 | 22.20 | 21.49 |
| Elongation @ Break (%) | 538 | 503 | 485 | 490 | 515 | 508 | 526 |
| Rebound | | | | | | | |
| Room Temperature (%) | 50.7 | 51.6 | 51.9 | 50.4 | 51.0 | 52.0 | 51.1 |
| 100° C. (%) | 63.4 | 67.2 | 65.8 | 62.5 | 64.1 | 64.0 | 63.0 |
| Stress Strain for 75 min. Cure @ 150° C. | | | | | | | |
| 300% Modulus (MPa) | 6.70 | 9.82 | 12.52 | 8.73 | 9.28 | 9.43 | 7.75 |
| (% Retained)[1] | (64.5) | (80.1) | (88.9) | (81.7) | (76.5) | (77.1) | (70.2) |
| Tensile @ Break (MPa) | 13.81 | 19.06 | 20.51 | 14.07 | 16.63 | 16.81 | 14.62 |

TABLE II-continued

| | | | | | | | |
|---|---|---|---|---|---|---|---|
| Elongation @ Break (%) | 512 | 513 | 472 | 449 | 483 | 480 | 490 |
| Rebound | | | | | | | |
| Room Temperature | 46.5 | 48.2 | 49.5 | 47.2 | 47.4 | 48.5 | 47.0 |
| 100° C. | 51.4 | 59.2 | 61.5 | 53.7 | 56.3 | 57.9 | 53.4 |
| (% Retained)[2] for 100° C. | (81.1) | (88.1) | (93.5) | (85.9) | (87.8) | (90.5) | (84.8) |

| Sample | Control 1 | 2 | 3 | Control 4 | 5 | Control 6 | Control 7 |
|---|---|---|---|---|---|---|---|
| Sulfur | 1.75 | 1.75 | 1.75 | 1.75 | 1.75 | 1.75 | 1.75 |
| CBTS | 0.75 | 0.75 | 0.75 | 0.75 | 0.75 | 0.75 | 0.75 |
| Bismaleimide | | | 1.30 | 1.30 | 0.65 | 1.30 | 0.65 |
| TBTD | | 0.30 | 0.30 | | 0.15 | | |
| TMTD | | | | | | 0.13 | 0.07 |
| Goodrich Flex Cured 15 minutes at 150° C.[3] | | | | | | | |
| % Set | 3.1 | 0.7 | 1.1 | 3.3 | 1.9 | 1.9 | 2.9 |
| Temp Rise, °C. | 7.2 | 2.8 | 1.7 | 6.7 | 5.6 | 2.8 | 20.6 |
| Goodrich Flex, Cured 75 minutes at 150° C. | | | | | | | |
| % Set | 4.2 | 1.2 | 0.9 | 2.5 | 1.9 | 1.9 | 3.2 |
| Temp Rise, °C. | 20.5 | 5.5 | 2.2 | 10.5 | 7.2 | 5.5 | 13.9 |
| Sulfur | 1.75 | 1.75 | 1.75 | 1.75 | 1.75 | 1.75 | 1.75 |
| CBTS | 0.75 | 0.75 | 0.75 | 0.75 | 0.75 | 0.75 | 0.75 |
| Bismaleimide | | | 1.30 | 1.30 | 0.65 | 1.30 | 0.65 |
| TBTD | | 0.30 | 0.30 | | 0.15 | | |
| TMTD | | | | | | 0.13 | 0.07 |
| Rheometer @ 150° C. | | | | | | | |
| Max. Torque (dNm) | 40.0 | 45.5 | 50.0 | 42.0 | 45.0 | 48.8 | 43.0 |
| Min. Torque (dNm) | 11.0 | 11.8 | 12.0 | 12.0 | 12.0 | 12.0 | 12.0 |
| Delta Torque (dNm) | 29.0 | 33.7 | 38.0 | 30.0 | 33.0 | 36.8 | 31.0 |
| T90 (min.) | 11.1 | 6.0 | 7.2 | 14.0 | 8.8 | 7.2 | 9.0 |
| T75 (min.) | 9.0 | 5.4 | 6.3 | 10.5 | 7.5 | 6.1 | 7.5 |
| T50 (min.) | 7.2 | 5.0 | 5.8 | 8.1 | 6.9 | 5.5 | 6.5 |
| T25 (min.) | 6.2 | 4.5 | 5.2 | 6.9 | 6.2 | 5.0 | 5.8 |
| T(1)[4] (min.) | 4.8 | 3.5 | 4.0 | 4.8 | 4.8 | 3.8 | 4.2 |
| Cure Rate (dNm/min.)[5] | 4.0 | 11.7 | 10.4 | 2.8 | 7.2 | 9.4 | 5.6 |
| Reversion (Minutes)[5] | | | | | | | |
| Max. Torque - 1 pt | 7.0 | 6.0 | 30.0 | 17.5 | 7.0 | 8.0 | 8.0 |
| Max. Torque - 2 pt | 11.0 | 13.5 | 108.0 | 42.5 | 17.0 | 16.0 | 15.0 |
| Max. Torque - 3 pt | 19.0 | 24.5 | 205.0 | 92.5 | 37.0 | 28.0 | 24.0 |

[1] The amount of 300% modulus that is retained in going from a 15 minute cure at 150° C. to a 75 minute cure at 150° C.
[2] The percent of rebound that is retained in going from a 15 minute cure at 150° C. to a 75 minute cure at 150° C.
[3] ASTM D623 (Method A)
[4] Time to a one point rise.
[5] Cure rate = $\frac{(T90\ Torque) - (T(1)\ Torque)}{T90 - T(1)}$
[5] The time required to observe the respective point loss or drop in cure state relative to the maximum cure state.

Control Sample 1 (Table II) represents a control containing a conventional cure system (sulfur/CBTS, 1.75/0.75 phr). Control Sample 2 contains TBTD (0.3 phr) and exhibits an increase in cure rate (from 4.0 dNm/min. to 11.7 dNm/min.) but only a small improvement in reversion resistance as measured by the time required for a 3 dNm (point) drop from the maximum cure state (Max. Torque 3 point). It took 19 minutes for the control Sample 1 to revert 3 points. from maximum torque versus 24.5 minutes with added TBTD.

Control Sample 4 incorporates bismaleimide (1.3 phr) which resulted in reducing the compound cure rate from 4.0 dNm/min. to 2.8 dNm/min. and improvement in the compound's resistance to cure reversion (92.5 minutes).

The combination of TBTD, bismaleimide and CBTS significantly improved cure reversion while maintaining a fast cure rate (see Sample 3). Cure reversion resistance was extended to 205 minutes and the cure rate maintained at 10.4 dNm/min. with the addition of 0.3 phr TBTD, 0.75 CBTS, and 1.3 phr bismaleimide. This would compare to 19 minutes and 4.0dNm/min. for the control Sample 1. It is important to note that the contribution of TBTD, bismaleimide, and CBTS in combination for cure reversion improvement is considerably less (more desirable) compared to the controls (Samples 2 and 4).

TBTD is a critical component in the present invention. TBTD (Sample 3) was compared to TMTD (Control Sample 6) at an equal molar level in combination with CBTS and bismaleimide. The use of the TBTD/bismaleimide/CBTS combination provided better cure reversion resistance, (Sample 3, Max. Torque–3 points=205 minutes) than the comparative TMTD/bismaleimide/CBTS combination (Control Sample 6, Max. Torque–3 points=28 minutes).

Note also that the TBTD/bismaleimide/CBTS combination (Sample 3) gave better reversion resistant properties versus bismaleimide/CBTS (Control Sample 4, cure reversion of 205 minutes versus 92.5 minutes). The cure reversion for the TMTD/bismaleimide/CBTS combination (Control Sample 6) was inferior to the bismaleimide/CBTS compound (Control Sample 4, cure reversion 28 minutes versus 92.5 minutes respectively). The above data clearly shows the uniqueness and unobvious nature of TBTD when used in combination with bismaleimide.

Table II stress strain properties demonstrate the ability of the TBTD/bismaleimide/CBTS composition to provide improved retention of physical properties, i.e., reversion resistance, at overcure conditions. In the examples, samples were cured for both 15 minutes (initial cure) and 75 minutes (overcure) at 150° C. Overcure data inspection shows that the TBTD/bismaleimide/CBTS composition (Sample 3) had a higher percent property retention for 300% modulus (88.9%) than the control Sample 1 (64.5% retention), Control Sample 2, (80.1% retention) or Control Sample 4, (81.7% retention). Similar behavior can be found by inspecting rebound data measured at 100° C. The overcure data demonstrate that the TBTD/bismaleimide/CBTS composition (Sample 3) had a higher percent retention for 100° C. rebound (93.5%) versus either the control Sample 1, (81.1% retention), Control Sample 2, (88.1% retention), Control Sample 4, (85.9% retention).

Another measure of compound integrity is to measure heat generation in a compound when subjected to repeated deformations. Heat generation leads to higher compound temperatures and ultimately to degradation of physical properties. Goodrich Flex data, from Table II, show that the TBTD/bismaleimide/CBTS composition had only a minimal increase in heat generation when the cure was increased from 15 to 75 minutes (overcure). The Goodrich Flex data for a compound of the present invention (Sample 3) compared to the controls (Sample 1, Sample 2, and Sample 4) demonstrate the clear advantage of the unique combination of TBTD, bismaleimide, and CBTS. For example, Sample 3 had an increase in the temperature rise of from 1.7° C. to 2.2° C. The controls had significantly higher increases in the temperature rise (7.2° C. to 20.5° C., 2.8° C. to 5.5° C., and 6.7° C. to 10.5° C.).

To further demonstrate the TBTD is a unique component to this cure composition compare the use of TBTD (Sample 3) to the use of TMTD (Control Sample 6). In Sample 3 and Control Sample 6, the thiuram disulfides are used at an equal molar level in combination with bismaleimide and CBTS. The TBTD/bismaleimide/CBTS combination provided better reversion resistance as indicate by better retention of 300% M at the overcure conditions (88.9% retention) versus the TMTD/bismaleimide/CBTS combination (77.1% retention). This would represent a 11.8% loss in overcure reversion resistance on switching from TBTD to TMTD. Note also a higher percent retention in rebound is maintained at overcure with TBTD (Sample 3, 93.5% retention) versus TMTD (Control Sample 6, 90.5% retention). Likewise TBTD shows its advantage over TMTD on examination of the Goodrich Flex data of Table II. The TBTD/bismaleimide/CBTS containing composition (Sample 3) provided for minimal increase in heat generation on going from a 15 minute cure to a 75 minute overcure condition. The Control sample 6 with TMTD showed that the Goodrich Flex temperature rise was not stable when the sample was overcured from 15 minutes to 75 minutes. An increase in the established equilibrium temperature from 2.8° C. to 5.5° C. was observed. Thus, TMTD introduces more hysteresis to the compound on overcure than does TBTD. Since both TBTD and TMTD belong to the same thiuram disulfide chemical class, these examples serve to demonstrate the non-obvious character of the TBTD/bismaleimide/CBTS composition versus other thiuram/bismaleimide/CBTS compositions such as TMTD/bismaleimide/CBTS in providing reversion resistant properties.

What is claimed is:

1. A rubber stock comprising:

(a) a rubber selected from the group consisting of natural rubber, a rubber derived from a diene monomer and mixtures thereof, (b) from about 0.10 to about 0.75 phr of tetrabenzylthiuram disulfide;

(c) from about 0.5 to about 3 phr of a bismaleimide compound of the general formula:

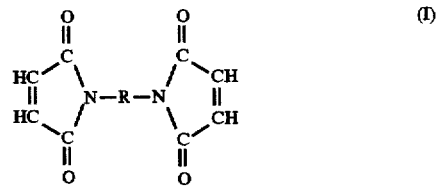

wherein R is a divalent acyclic aliphatic group having from about 2 to 16 carbon atoms, cyclic aliphatic group having from about 5 to 20 carbon atoms, aromatic group having from about 6 to 18 carbon atoms, or alkylaromatic group having from about 7 to 24 carbon atoms and wherein these divalent groups may contain a hetero atom selected from O, N and S;

(d) from about 0.5 phr to about 3 phr of a sulfenamide compound of the general formula:

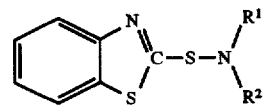

wherein $R^1$ is hydrogen, an acyclic aliphatic group having from about 1 to 10 carbon atoms, or a cyclic aliphatic group having from about 5 to 10 carbon atoms; and $R^2$ is hydrogen, a cyclic aliphatic group having from about 5 to 10 carbon atoms or a mercaptobenzothiazolyl group of the formula:

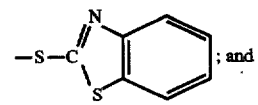; and.

(e) from about 0.5 to about 6 phr of sulfur, a sulfur donor and mixtures thereof.

2. The rubber stock of claim 1 wherein said bismaleimide is selected from the group consisting of N,N'-ethylenebismaleimide, N,N'-hexamethylenebismaleimide, N,N'-(m-phenylene)bismaleimide, N,N'-(p-phenylene)-bismaleimide, N,N'-(p-tolylene)bismaleimide, N,N'-(methylenedi-p-phenylene)-bismaleimide, N,N'-(oxydi-p-phenylene)bismaleimide, α,α-bis-(4-phenylene)-bismaleimide, and α,α-bis-(4-maleimidophenyl)-meta-diisopropylbenzene.

3. The rubber stock of claim 1 wherein said rubber derived from a diene monomer is selected from the group consisting of natural rubber, synthetic cis-1,4-polyisoprene, polybutadiene, polychloroprene, copolymers of isoprene and butadiene, copolymers of acrylonitrile and butadiene, copolymers of acrylonitrile and isoprene, copolymers of styrene, butadiene and isoprene, copolymers of styrene and butadiene and blends thereof.

4. The rubber stock of claim 1 wherein (a) from about 0.10 to 0.50 phr is tetrabenzylthiuram disulfide; (b) from about 0.65 to 2.0 phr is a bismaleimide compound; (c) from about 0.70 to 2.0 phr is a sulfenamide compound; and (d) from about 0.75 to 2.0 phr is sulfur, a sulfur donor, and mixtures thereof.

5. The rubber stock of claim 1 wherein said sulfenamide compound is selected from the group consisting of N-cyclohexyl-2-benzothiazylsulfenamide, N-isopropyl-2-benzothiazylsulfenamide, N-t-butyl-2-benzothiazylsulfenamide, N-t-butyl bis-(2-benzothiazylsulfen)amide, and N,N-dicyclohexyl-2-benzothiazylsulfenamide.

6. The rubber stock of claim 1 wherein said sulfur and sulfur donor are selected from the group consisting of elemental sulfur, an amine disulfide, polymeric polysulfide and sulfur olefin adducts.

* * * * *